Nov. 14, 1967 — P. GALABERT ET AL — 3,352,015
APPARATUS AND METHOD FOR CUTTING GLASS
Filed April 2, 1965 — 4 Sheets-Sheet 1
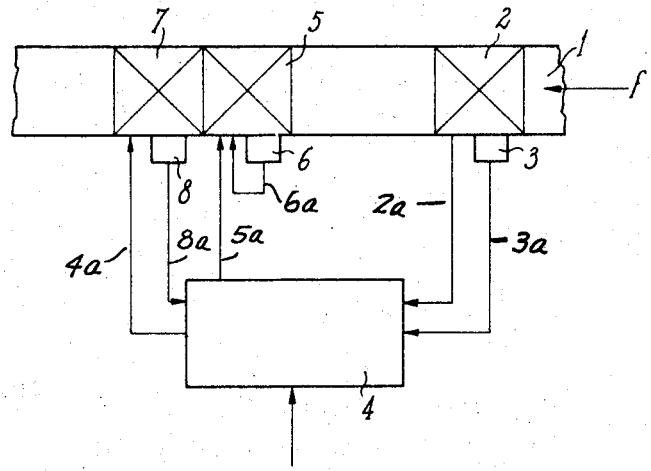
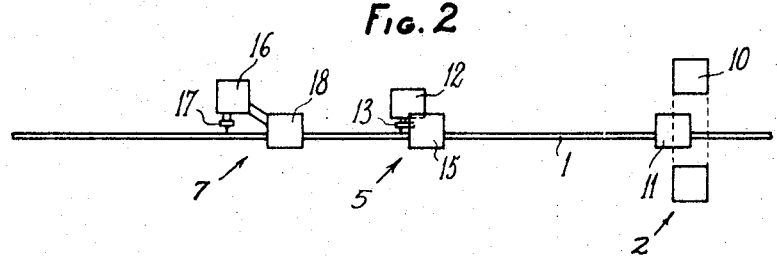
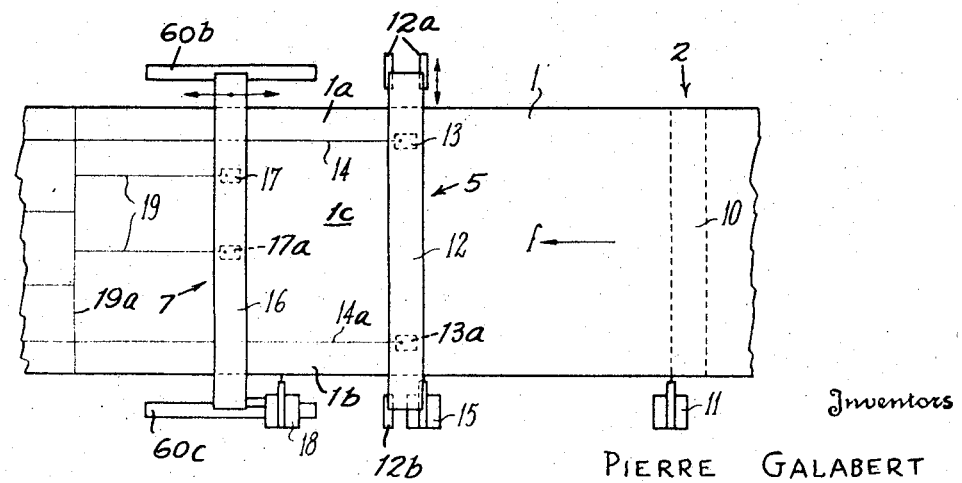
Inventors
PIERRE GALABERT
MARCEL PILLON
By Bauer and Seymour
Attorneys

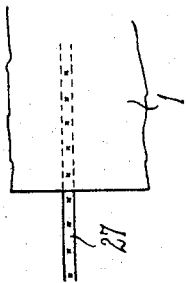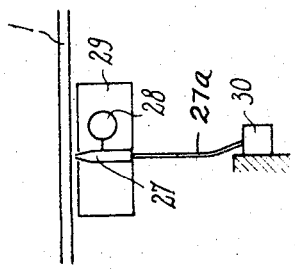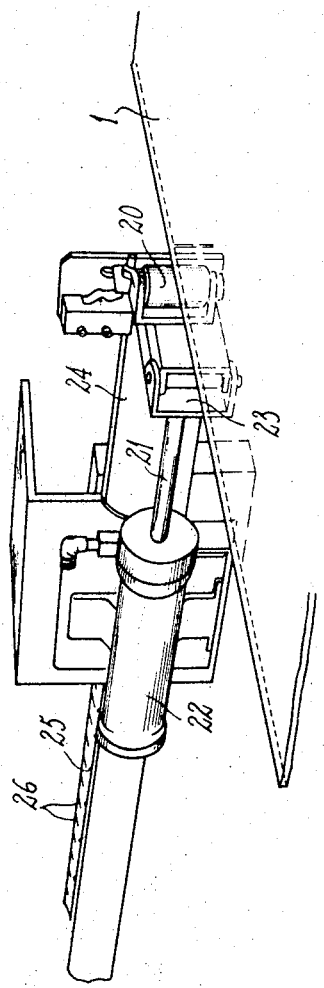

Nov. 14, 1967  P. GALABERT ET AL  3,352,015
APPARATUS AND METHOD FOR CUTTING GLASS
Filed April 2, 1965  4 Sheets-Sheet 3

Inventors
PIERRE GALABERT
MARCEL PILLON

By Bauer and Seymour
Attorneys 3,352,015
APPARATUS AND METHOD FOR CUTTING GLASS
Pierre Galabert, Rueil-Malmaison, and Marcel Pillon, Le Vesinet, France, assignors to Compagnie de Saint-Gobain, Neuilly-sur-Seine, France
Filed Apr. 2, 1965, Ser. No. 445,180
Claims priority, application France, Apr. 6, 1964, 969,824
15 Claims. (Cl. 33—32)

ABSTRACT OF THE DISCLOSURE

A ribbon of material such as glass is continuously moved by a conveyor but may undesirably shift laterally with respect thereto. Simultaneously with movement of the ribbon, side strips to be discarded are delineated by scribers and the remaining central area is scribed into sheets or usable sizes, while eliminating defective spots therein. The invention establishes a longitudinal center line of the ribbon and a fixed base line parallel with and offset from the center line, senses the edge of the ribbon, and automatically adjusts the scribers to maintain them at predetermined distances from the center line, based on changes in distance between the center and base lines.

---

The present invention relates to the cutting or severing into sections or panels, of a continuous ribbon of sheet material during its production and in accordance with a plan formulated in view of the location therein of defective spots or areas which have been previously identified.

A principal object is to sever a ribbon of material such as glass, into sections or panels of desired sizes by scribing in or on the ribbon a series of mutually normal lines some of which are longitudinal of and parallel with the edges of the ribbon and others of which are perpendicular to the longitudinal lines so that the ribbon is eventually divided up along lines resulting in a series of panels each of which is perfect and of a desired size and which at the same time eliminate with a minimum loss of saleable material, spots or areas which are commercially acceptable.

Ancillary to the foregoing object, it is a further object to locate the aforesaid defects, formulate a plan of cutting and carry the plan into execution while the ribbon such as glass, is continuously moving on a conveyor, for example, as it emerges from a leer or annealing oven.

In present procedures the ribbon is first cut into relatively long sections and each section is, in turn, positioned upon a large rectangular cutting frame. The location and identification of the defects in the sheet are made by visible marks placed thereon, or the positions of these are transmitted to a control station where a plan of cutting is formulated. At this station the location of each defect is identified by coordinate distances to be measured along the edges of the sheet and normal thereto.

The foregoing procedure is not entirely satisfactory. Actually it is not possible in practice to utilize the entire commercially acceptable area of each large sheet, so that a part of the area is lost in the form of unsaleable relatively narrow strips of glass which, however, would otherwise be saleable. Moreover, handling of the large sheets requires expensive, cumbersome and complicated mechanism.

It is therefore another object to provide a method and apparatus which obviate the foregoing prior art drawbacks, by the identification of the defects and the formulation and carrying out of a plan of cutting, directly upon the continuous ribbon during production, rather than upon discrete large sheets or panels into which the ribbon has been severed.

While the elimination of prior art difficulties as just described, is highly desirable, it also presents certain problems which it is a further object of the present invention to overcome.

According to this invention the defects in the ribbon of glass are detected and their location over the ribbon determined just prior to the time the ribbon passes to the scribing and cutting means. The location of the defects is made at a certain distance in advance of the scribing and cutting such that, based upon the rate of movement of advance of the sheet or ribbon, there is sufficient time to formulate a plan of cutting. It is, of course, necessary to know precisely the location of each defect with respect to the scribing means. The determination of the positions of the defects in the direction of movement of the ribbon may be effected by various procedures and means, especially those disclosed in a prior application Ser. No. 343,742, filed Feb. 10, 1964 entitled Method and Apparatus for Determining at Each Instant the Distance of Movement of a Material in the Form of a Continuous Ribbon. The present invention is particularly concerned with and has for an object the location of defective spots or areas of the ribbon and the scribing therein of longitudinal lines which will eliminate those areas while resulting in cutting of the ribbon into saleable panels of required, predetermined sizes.

Yet another object is the provision of means for scribing the ribbon with two laterally-spaced parallel lines each generally parallel with and adjacent a respective edge of the ribbon, for the elimination of relatively narrow side bands thereof while maintaining the side band scribers at a constant fixed distance of separation.

The locations of the positions of the scribed lines by direct comparison with the edge of the ribbon presents difficulties. Applicants have found that the ribbon of glass during production does not proceed according to a perfect movement of translation but, to the contrary, has a gradual lateral shift in one direction or the other with respect to its average position on the conveyor. These lateral displacements are probably caused by irregularities in the annealing and cooling of the ribbon, which act to create internal tensions with the result that contact between the ribbon and the conveyor upon which it is supported and by which it is translated, it not uniform over all areas of the ribbon and, as a result the ribbon tends to creep sideways. Other reasons for the aforesaid irregular transverse creep are mechanical defects in the conveyor, particularly an out-of-level condition thereof, lack of perpendicularity of the axes of the rollers in relation to the direction of movement of the ribbon, and variations in the diameters of the rollers of the conveyor. All of these factors contribute to lateral displacement of the ribbon and which, in extreme cases may be as much as 20 centimeters from the average normal position with respect to the center line of the conveyor.

Ordinarily, when a defect is detected by the detection means, it indicates the position of the defect with respect to a fixed reference or datum line. These detection devices must be, and by their very nature are, extremely sensitive, and in order that they may function correctly are maintained strictly immobile, so that it is not possible to displace them in accordance with corresponding displacements of the ribbon.

It is therefore another purpose and object of the invention to determine the position of the edge of the ribbon and the position of a defect, each with respect to a fixed base or datum line, and then deduct the position of the defect with respect to the edge of the ribbon from the position of the edge of the ribbon with respect to this datum line and from the position of the defect with respect to the datum line, to thereby give a measure of the true location of the defect.

According to one method of procedure in practice of the invention, the initial determination of the location of an edge of the ribbon is obtained by a device which is independent of the defect-detecting apparatus. In another embodiment this initial determination is made by the detecting means itself. In fact the edge of the ribbon is detected by the detecting means as if it constitutes a defect. The corresponding signal, which is usually eliminated, is according to the invention used to determine the position at this moment of the edge of the ribbon.

It is a further object to provide a method and an apparatus wherein the position of each defect in the ribbon with respect to the datum line is measured in a direction normal to the line, the location of the edge of the ribbon at the same place and time is also measured, the two values are transmitted separately to a computer or control station where they are combined to give a measure of the true position of the defect relatively to the edge of the ribbon. This true position is then transmitted to the mechanism for scribing the lines which will delineate the completed panels, and used at each mechanism in connection with edge-sensing or scanning means to adjust the scribers despite lateral shift or creep of the moving ribbon.

According to yet another object apparatus is provided for the continuous scribing of the lines parallel with and adjacent each respective side edge of the ribbon to delineate the side bands thereof which will be discarded. In this case the scribing devices are positioned transversely in accordance with the width of the side bands which will be subsequently eliminated. The position of the edge of the ribbon is determined in the transverse vertical plane of the scribers, either continuously or intermittently at sufficiently close intervals. Since lateral movements of the ribbon are relatively slow it is not absolutely necessary to effect continuous adjustment of the scribers. In general it is sufficient and satisfactory to verify or check the positions of the scribers at frequent time intervals.

It is another object to provide a mode or method and apparatus for carrying out the plan of cutting, that is to say, the scribing upon the surface of the central band of the ribbon, the lines along which it will be severed in order to eliminate defective areas thereof and to separate the other areas along lines which will result in panels of predetermined sizes. This may be done manually but preferably, according to more up-to-date procedures, by a computer. The transverse positions of the scribed lines extending longitudinally of and along the ribbon is determined at the computer or control station and transmitted and used to automatically control and maintain the respective transverse positions of the scribers. The position of the edge of the sheet in the transverse vertical plane of these scribers is sensed, transmitted back to the computer and there used to compute the position of each scriber to maintain it in fixed predetermined relation transversely of the ribbon, with respect to the previously scribed side band lines.

Other characteristic, objects and advantages of the invention will become clear to those skilled in the art, after a study of the following detailed description, in connection with the accompanying drawing.

In the drawing:

FIGURE 1 is a schematic view of the general arrangement of parts for carrying the invention into practice;

FIGURE 2 is an elevational view corresponding to FIGURE 1;

FIGURE 3 is a plan view of the arrangement depicted upon FIGURE 2;

FIGURE 4 is a perspective view of means for sensing the edge of the ribbon and transmitting the position sensed thereby;

FIGURE 5 is a detail plan view of a pneumatic type of sensing mechanism;

FIGURE 6 is an elevational view of the device of FIGURE 5;

Figure 9:
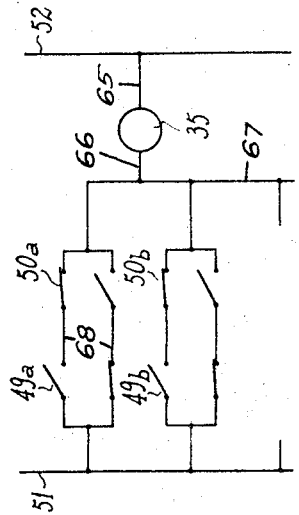
Figure 7:
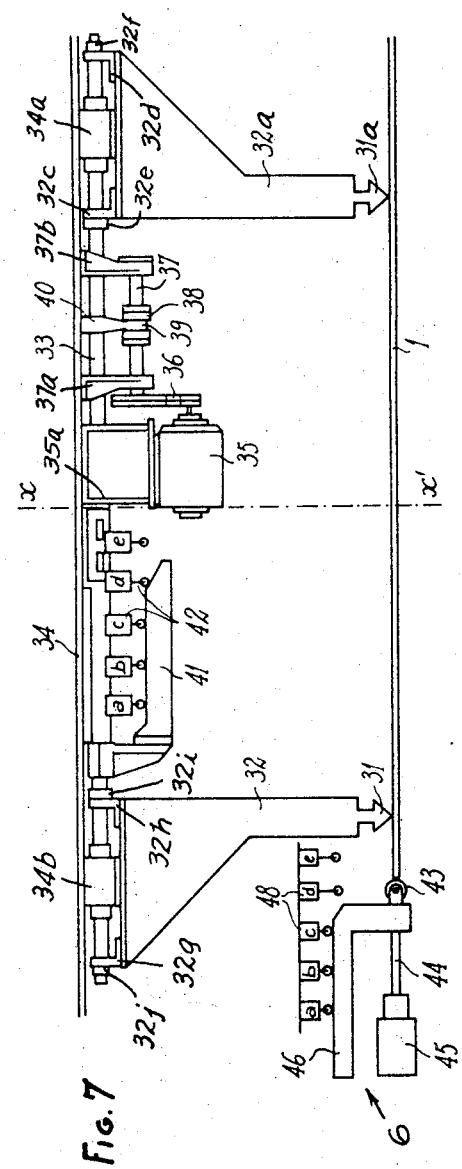
FIGURE 7 is an elevational view of the device for scoring or scribing the side band lines of the ribbon and is looking in the direction of travel of the ribbon.
Figure 8:
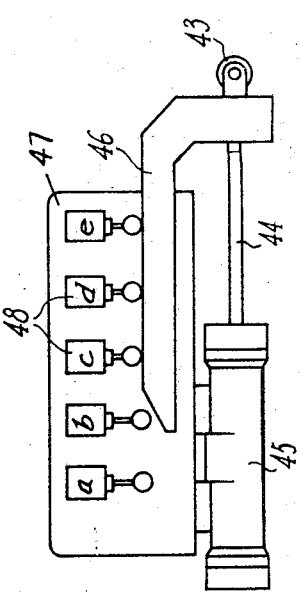
FIGURE 8 is a detail view to an enlarged scale of edge sensing means embodied in the apparatus of FIGURE 7.
Figure 10:
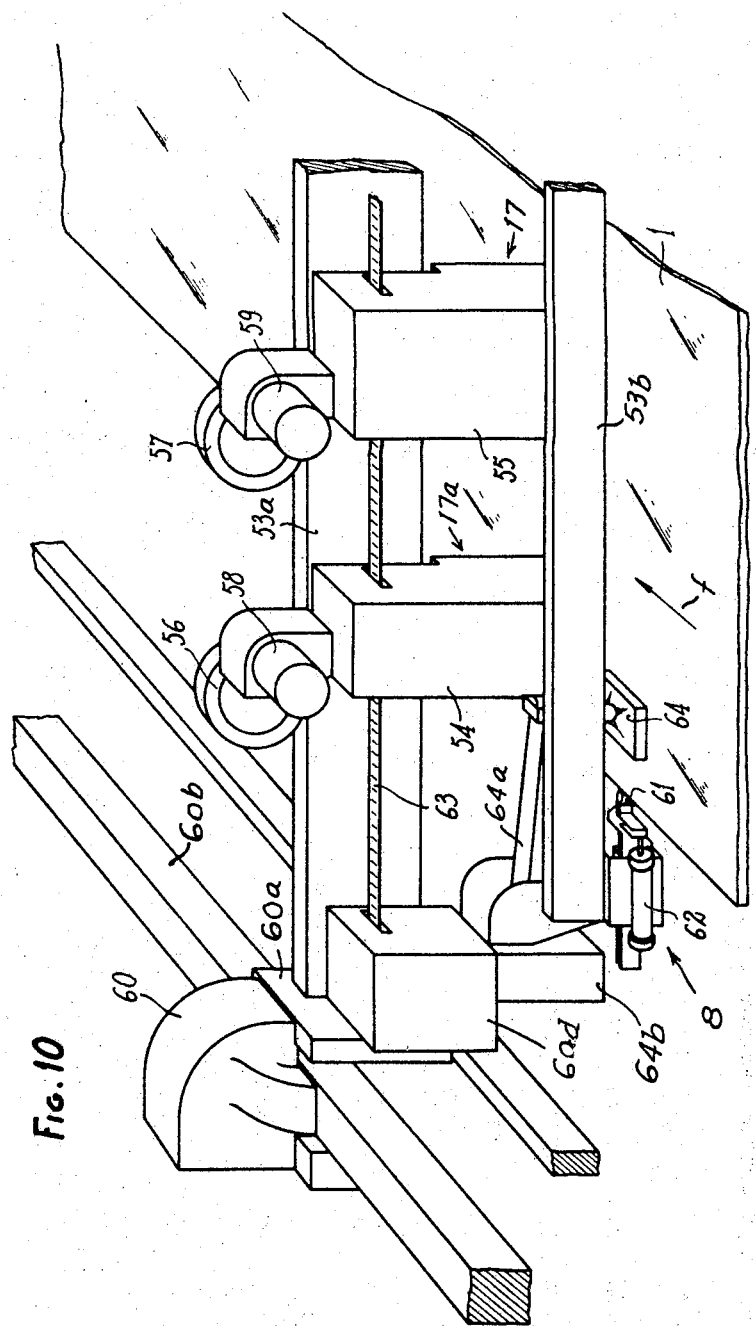

FIGURE 9 is a partial circuit diagram showing how the edge sensing means of FIGURE 8 controls the scribers of FIGURE 7 to maintain them in fixed transverse positions relatively to the central line of the ribbon; and FIGURE 10 is a perspective view to an enlarged scale, of apparatus for scribing the central band of the ribbon along lines extending longitudinally thereof and for controlling and carrying as required, the transverse positions of the scribers thereof.

Referring to FIGURE 1, 1 represents a ribbon of glass moving with a conveyor, not shown, in the direction of arrow *f*. At 2 the ribbon passes in operative relation with a device which locates the defects to be eliminated and at the same time, by sensing means 3 determines the position of the contiguous edge of the ribbon with respect to a fixed longitudinally-extending base or datum line. The locations of the defects as detected upon the ribbon, and the position of the edge thereof are transmitted over lines 2a and 3a, respectively, to a control station 4 where a plan of cutting of the ribbon is formulated, based upon the positions of the several defects located at 2. Apparatus 4 may be a computer. The ribbon passes in sequence, side band remover or scriber 5 which receives over line 5a from computer or control station 4, the correct locations of the longitudinal lines to be scribed on or in the ribbon and which will delineate the side bands to be eliminated and discarded. More particularly, the dimension transmitted from the station 4 is the distance from the datum line, normal thereto, to a point in the plane of the ribbon midway between the side band lines to be, or being scored.

At the same time, pick-off device 6 senses the adjacent edge of the ribbon with respect to the datum line and in response to any lateral shift or creep of the ribbon, energizes a follow-up control to correspondingly horizontally and transversely shift both scribers as a unit to maintain the position of a central longitudinal vertical plane midway between the side band scribers, in coincidence with the aforesaid point.

Ribbon 1 then immediately passes to the scribing means 7 where it is cut or scribed along longitudinally-extending lines in accordance with the plan formulated at the control station or computer. The locations of these lines transversely of the ribbon is controlled by signals from the station over transmission lines 4a. The locations of these lines, of course, takes into account the positions of the previously identified defects in the central band of the ribbon, and the widths of panels into which the perfect areas thereof are to be severed. At the same time the edge of the ribbon in the transverse vertical plane of the central band scribers is sensed by pick-off device 8 and conveyed over lines 8a back to station 4 where this position is taken into account in establishing the correct instantaneous transverse locations of the several lines being scribed, to thus assure that they are at all times correctly spaced from and with respect to the side band lines previously scribed. Since all dimension signals are with respect to a fixed datum line extending along and parallel with the direction of travel of the ribbon, it is not necessary that side band scribing device 5 be in advance of central band scribing device 7. To the contrary the positions of these devices as shown at FIGURE 1 may be reversed.

FIGURES 2 and 3 show ribbon 1 moving in the direction of arrow f. The marking of defects therein is effected at 10, corresponding to item 2, FIGURE 1, and a sensing device 11, corresponding to 3, FIGURE 1, is fixed with respect to the frame supporting the defect-detecting means and has its follower in contact with the edge of the ribbon. At 12 is identified a bridge forming a part of item 5, FIGURE 1, mounting side band scribers 13, 13a and which scribe in the ribbon the longitudinal lines 14, 14a along which the ribbon is severed to eliminate the relatively narrow side bands thereof, 1a and 1b. At 15 is identified a pick-off or sensing device having a follower in contact with one edge of the ribbon and which acts to continuously or intermittently correct the positions of the scribers 13, 13a. This item corresponds to item 6, FIGURE 1.

Also shown upon FIGURES 2 and 3 is a second bridge 16 forming an element of device 7, FIGURE 1, and on which are mounted scribers 17, 17a for carrying out the pre-formulated plan of longitudinal scribing of central band 1c along lines such as 19. At the same time, sensing device 18, corresponding to item 8, FIGURE 1, is in contact with the edge of the ribbon at this point and continuously transmits the position thereof to station 4, with respect to the datum line. It is noted that bridge 12 is movably mounted, as by rollers not shown, for guided movement on tracks 12a, 12b horizontally transversely over the ribbon, and that bridge 16 is similarly movably mounted for guided movement on tracks 60b, 60c longitudinally of and over the ribbon.

FIGURE 4 illustrates the construction of one of the means for sensing and determining the position of an edge of the ribbon with respect to the fixed base or datum line. This means comprises a feeler or roller 20 mounted by frame 23 on the distal end of piston rod 21 of the piston within cylinder 22. The axis of the cylinder and rod are normal to the edge of the ribbon in the plane thereof. Fluid under pressure is admitted to the cylinder to urge and maintain feeler 20 in contact with the edge of the ribbon. Frame 23, fixed with rod 21, carries a slide 24 which, in turn, mounts a gage 25. The gage consists of a flat elongated strap extending parallel with rod 21 and provided with slits 26 spaced therealong. The strap moves between a source of light and a photoelectric cell, not shown, in response to shifting of the edge of the ribbon with respect to the base line, so that the cell generates a number of pulses equal to the number of slits 26 which have passed between the source and cell or, what is the same thing, the distance that the gage has been moved by cylinder 22 in one direction and by the ribbon in the reverse direction.

FIGURES 5 and 6 show a pneumatic form of edge sensing means which may be employed in substitution for the photoelectric form of FIGURE 4. Gage 25 is replaced by a plurality of nozzles 27 mounted in vertical position on a fixed base 29 and uniformly spaced in and along a line just below ribbon 1, normal to the edge and parallel with the plane thereof. Each nozzle is connected by its own pipe 27a with a respective one of a plurality of pressure-responsive switches 30. All nozzles are supplied with air under pressure from a source pipe 28, so that when ribbon 1 in lateral shift moves over a nozzle, the increase in pressure at switch 30, due to obturation of that nozzle, acts to close the switch contacts and to create a signal which is transmitted and utilized as a measure of the shift with respect to the fixed base or datum line.

FIGURE 7 shows an arrangement for scribing and delineating the relatively narrow bands along each edge of the ribbon, such as that generally identified at 5, FIGURE 1. The two scribers 31, 31a are fixed, each with its support 32, 32a. These supports are, in turn, adjustably fixed to a shaft 33 journaled by bearings 34a, 34b carried by bridge 34 which, it is noted, corresponds to item 12, FIGURE 3. It should be noted also that the scribers presently identified as 31, 31a, correspond to items 13, 13a, FIGURE 3.

Referring to scriber support 32a, this support is mounted on shaft 33 by a pair of 90° brackets 32c, 32d. The support is adjustable along and axially of the shaft and is fixed in position relatively thereto by means such as collars 32e, 32f. Means not shown are provided to positively and individually move each scriber 31, 31a to and from scribing contact with ribbon 1. Since scriber mount 32 is an allochiral duplicate of 32a and is similarly mounted on shaft 33 at the other side edge of the ribbon, it is sufficient to identify brackets 32g, 32h, and collars 32i, 32j.

Shaft 33 is mounted for axial adjustment on and relatively to bridge 34 so that the shaft and both scribers may be shifted as a unit transversely of the ribbon as required. For this purpose a motor 35 is mounted to a bracket 35a fixed to and depending from the bridge. The motor is connected by a belt and pulley connection 36, to rotate a shaft 37 threaded at its intermediate portion. The ends of shaft 37 are journaled in bearings 37a, 37b, fixed to the bridge in space relation therealong. A bracket 40 is fixed to shaft 33 and has a forked lower end embracing shaft 37. Collars 38 are fixed to the lower end of bracket 40 at each side thereof and are internally threaded to engage the threads of shaft 37. Motor 35 is reversible and by the connections just described is operable to shift as a unit, shaft 33, supports 32, 32a, and scribers 31, 31a, transversely of the ribbon.

A control cam 41 is shaped as shown upon FIGURE 7 and has one end rigidly attached to shaft 33 so that the aforesaid translation of the shaft by motor 35 also effects a corresponding movement of the cam. A series of equally-spaced switches such as microswitches 42a, 42b, 42c, etc., are fixedly mounted on bridge 34 and are so located that the plunger or other operating element of each may be actuated by the passage of cam 41 thereunder, in response to axial shift of shaft 33. For example, FIGURE 7 shows the operating toggle of switch 42d about to be actuated to close its contacts by and in response to further translation of shaft 33 and cam 41 to the right as viewed upon this figure.

At 48, FIGURES 7 and 8, there are identified a series of microswitches 48a, 48b, 48c, etc., each corresponding to one of those identified at 42a, etc. Switches 48a, etc. are fixed to a plate 47 securely attached to any convenient fixed part of the frame of the conveyor in spaced relation along a line normal to ribbon 1 and a little above the plane thereof. A pressure fluid cylinder 45 is also fixed to plate 47 with its axis parallel to the aforesaid line. The piston rod 44 of the piston in cylinder 45 has a follower or roller 43 attached to its distal end and, adjacent the roller, a cam 46. As clearly shown, cams 41 and 46 are allochiral duplicates. Follower 43 is so positioned that, as in the case of cylinder 22, FIGURE 4, pressure fluid introduced into the cylinder acts to urge the follower into contact with the edge of the ribbon. Cam 46 is so positionally related with the switches 48a, etc., that when follower 43 is in contact with the contiguous edge of the ribbon, it acts to hold a predetermined number of these switches, for example three, closed, when the axis $x$–$x'$, FIGURE 7, coincides with the central longitudinal axis of the ribbon. By means subsequently described, motor 35 has been energized to shift cam 41 and corresponding close switches 42a, 42b and 42c.

FIGURE 9 shows the circuitry by which motor 35 is controlled. Each switch 48a, 48b, etc. controls and effects when closed, the excitation of the solenoid of a corresponding relay such as 49a, 49b, etc., while each switch 42a, 42b, etc., controls and when closed effects the energization of the solenoid of a corresponding relay such as 50a, 50b, etc. Each relay 49a, 49b, 50a, 50b, etc., has two contacts which are so arranged that when one of these contacts is closed the other is open. For any given relay the opening of one contact thereof is always accompanied by the closing of its other contact.

As clearly shown upon FIGURE 9, each contact of one relay is connected by a respective discrete lead with the corresponding contact of the other relay. For example, the contacts of relay 49a are connected with the contacts of relay 50a. As shown, power line 52 is connected by a lead 65 with one terminal of motor 35. The other terminal of the motor is connected by lead 66 with a lead 67 which is common to all contacts of relays 50a, 50b, etc. Leads such as 68 each connect one of the contacts of relay 50a, for example, with the corresponding contact of a relay 49a. Each pair of relays, 49a, 50a, for example, is so constructed and arranged that when the solenoids of both are energized, one contact 49a is open and the corresponding one of 50a is closed. Thus when relay 49a for example is energized, but not 50a, a circuit is completed through motor 35. When in continued operation of the motor, cam 41 is translated to a position closing switch 42a, its relay is operated to again open the circuit. Each relay is operated by its solenoid against the urge of a spring so that when de-energized the solenoid reverts to its original position.

Thus assuming the parts substantially as depicted upon FIGURE 7, if the ribbon shifts to the right a distance such that follower 43 in continuous contact with the edge thereof, effects movement of cam 46 to the right to close switch 48d, the corresponding relay is energized and the presently open contact thereof is closed while its other contact, presently closed, is opened. The result, obvious from inspection of FIGURE 9, is to close the circuit between power lines 51, 52, through motor 35. The motor then rotates in a direction to shift shaft 33 and cam 41 until the latter closes the corresponding switch 42d. Energization of the relay controlled by switch 42d operates the contacts thereof to open the circuit through the motor. It is contemplated that a reversing switch, not shown, in lead 65 or 66 will be automatically actuated in accordance with the direction of translation of cam 46 so that motor 35 will thereby be controlled at all times to maintain axis x–x' centralized with respect to the traveling ribbon.

FIGURE 10 shows an embodiment of the apparatus for scribing upon the central band of the ribbon, the lines along which it is to be severed into sections or panels. A bridge 53 which corresponds to item 7, FIGURE 1, extends transversely over and across ribbon 1 and is mounted at its ends by rollers, not shown, for guided translation in the direction of the traveling ribbon. One track is identified at 60b, the other at 60c, FIGURE 3.

Bridge 53 carries two scribing tools 54 and 55, corresponding generally to items 17a, 17, respectively, FIGURE 3, each mounted for independent guided translation on and along the bridge in a horizontal direction transversely of the ribbon. The bridge includes a track member 53a. Scribing tool 54 mounts at its top a reversible motor 58 which drives wheel 56, in frictional contact with track 53a. The drive is through reduction gearing not shown, so that when the motor is energized the scriber is moved along the bridge in one direction or the other. Tool 55 may be a duplicate of 54, so that it is sufficient to identify reversible motor 59 and wheel 57, also in frictional contact with track 53a.

Power means are provided in the form of a reversible motor 60 for translating bridge 53 in the direction of travel of the ribbon. The motor housing is attached to bridge 53a at 60a, and drives through a reduction gearing, not shown, a wheel in frictional engagement with tracks 60b.

The position of the edge of ribbon 1 is sensed by a follower or roller 61 in contact with the edge. The fluid pressure cylinder 62 and its connection with the follower may be the same as have been previously described in connection with FIGURE 4, so that it is unnecessary to repeat the description. Pressure fluid introduced into cylinder 62 acts to maintain follower 61 against the contiguous edge of the ribbon. Follower 61 and its assembly detect and transmit to control station 4 the displacement from normal, of the instantaneous position of the contacted edge of the ribbon. This value is taken into account by the computer or operating personnel in positioning the scribers 54 and 55 correctly with respect to the edge of the ribbon, so that the width of the panels or sheets being scribed are continuously maintained at their correct predetermined values.

Scribing tools 54 and 55 also carry photoelectric cell scanning units which operate in connection with a fixed gage strap 63. This gage which is shown as a strip of metal or other opaque material pierced with regularly spaced slits, is adjustably fixed at one end within casing 60d forming an integral part of the bridge assembly. As the scribers are translated on and along bridge 53a under drive by their respective motors 58, 59, an electrical impulse is generated each time one of the slits in 63 passes between a photoelectric cell at one side of the gage, and its lamp or illuminating means at the other side thereof. These impulses are transmitted back to the control station where they are employed to check the individual position of each scriber and used when a new transverse position thereof is required, as when a different width of panel is to be scribed.

A pad 64 is mounted on the bridge so that it may be lowered into frictional contact with the ribbon, or elevated therefrom. When lowered into contact with the ribbon the bridge is thereby caused to move as a unit with the ribbon in the direction of arrow f, FIGURE 10. Preferably but not necessarily, the pad is universally pivotally mounted at the distal end of an arm 64a. The other end of this arm is pivoted within casing 64b forming a part of the bridge assembly. The axis of pivoting is parallel with the direction of travel of the ribbon and means such as an electromagnet, not shown, is operatively connected with the arm such that, when energized, it acts to raise pad 64 out of contact with the ribbon. At other times, that is, when the electromagnet is de-energized, the pad pivots into contact with the ribbon.

Cylinder or jack 62 is put into operation by the introduction of fluid under pressure thereinto, and presses its follower 61 against the edge of the ribbon thus sensing the position thereof. As in the case of FIGURE 4, there is a gage or strap connected at one end with feeler 61 and provided with uniformly spaced slits or transverse slots. As previously described in connection with FIGURE 4, a photoelectric cell is fixed at one side of the gage and illuminating means therefor at the other side, so that an impulse of current is generated each time one of the slits passes between the cell and lamp. These impulses are transmitted to the control station and there serve to render available a true measure of the instantaneous location of the edge of the ribbon with respect to the fixed datum line. Since the exact positions of the scribers 54, 55 with respect to the aforesaid datum line is also available at the computer or control station, by reason of gage or strap 63, the algebraic addition of the two values affords a precise measure of the position of each of the scribers with respect to the ribbon. Motors 58, 59 and 60 are also controlled from the computer so that scribers 54, 55 may be accurately adjusted to any selected positions transversely of the ribbon, and maintained in those positions even although the ribbon varies in the distance of its reference edge from the aforesaid datum line or, what is the same thing, shifts transversely of the conveyor on which it is supported and by which it is translated.

By means not shown the scribers may be elevated from and lowered into scribing contact with the glass. Thus complete and accurate control of these scribers is at all times possible.

*Operation*

The operation will be generally clear from the foregoing description and is summarized as follows:

The glass is continuously drawn in ribbon form from a melting tank or furnace and then proceeds horizontally past stations where various operations are performed such as grinding, polishing and annealing, to make it saleable. As it emerges from the production line, still traveling in a horizontal path, the ribbon passes station 2 where defective spots or areas are identified, and accurately located with respect to the fixed datum line. The coordinates of each defect are transmitted to station 4. At the same time the position or separation of the adjacent edge of the ribbon is sensed at 3 and the dimension also transmitted to station 4 over lines 3a.

The relatively narrow side bands 1a and 1b along each side, are commercially unacceptable and must be removed and discarded. This is accomplished at station 5, FIGURES 1, 2, 3 and 7, where, in the manner previously described, transversely-spaced scribers 31, 31a are adjusted along tracks 12a, 12b in accordance with their positions previously determined with respect to the datum line as transmitted from station 4 over lines 5a. Any lateral shift or creep of the ribbon is corrected by a corresponding energization of motor 35. The side band lines thus scribed are identified at 14, 14a, FIGURE 3.

From station 5 the ribbon passes to station 7 where scribers 54, 55 are in scribing contact with the ribbon and are scribing lines 19 whereby central band 1c will be separated into panels of selected widths. It will be recalled that each scriber 54, 55 is individually moved by a respective one of motors 56, 57, under control from station 4. Thus, when a defect which must be eliminated passes station 7, the scribers may be raised from contact with the ribbon and moved to a position along bridge 53a such that the defect will lie between lines scribed thereby. Scribers 54, 55 are then lowered again into contact with the ribbon and motor 60 is energized to translate the bridge assembly along tracks 60b, 60c in the direction opposite to arrow *f*. After the scribers have passed the defect they may be restored to their initial positions or to any selected new positions.

It will be noted that either or both scribers 54, 55 may be used to transversely scribe the ribbon along lines such as 19a, FIGURE 3. This is done by lowering pad 64 into contact with the ribbon, simultaneously opening a clutch, not shown, connecting motor 60 with the friction wheel driven thereby and in contact with track 60b, so that the entire bridge assembly moves as a unit with the ribbon, and energizing one or both motors 58, 59, to cause the scribers, presently in contact with the ribbon, to score the transverse line. Alternatively one scriber may be moved to its extreme limiting position along the bridge and the other used alone to make the transverse scribe. While so moving with the ribbon, the scribers may be then restored to their former or to new positions for scribing lines 19, pad 64 raised and motor 60 energized to restore the bridge to its normal position. Of course, there may be one or more than two scribers mounted on bridge 53a.

The foregoing is but one of the many ways in which the invention may be usefully employed. In fact, one advantage is its extreme flexibility and versatility. The important fact is that a skilled operator or computer, has precise control over all scribers at all times so that they may be adjusted and moved to delineate scribing lines which result in increased production of panels of perfect glass of desired sizes and eliminate with a minimum loss of saleable glass those areas or spots not commercially acceptable.

While we have disclosed the form of our invention presently preferred by us, numerous modifications, alterations, substitutions of equivalents, and modes of use will occur to those skilled in the art, after a study of the foregoing description. Hence the disclosure should be taken in an illustrative rather than a limiting sense; and it is our desire and intention to reserve all changes within the scope of the subjoined claims.

Having fully disclosed the invention, what we claim and desire to secure by Letters Patent is:

1. The method of scribing a ribbon of material along a line parallel with the longitudinal center line of the ribbon, comprising, mounting a scribing tool over the ribbon for movement transversely thereof and for scribing contact therewith, adjusting the tool transversely of the ribbon to a desired position from one edge thereof, sensing the distance from a fixed base line parallel with an offset from the normal position of said center line, of a point in said edge intersected by a plane transverse of and normal to the ribbon and positioned contiguous to the scribing tool, effecting relative translation parallel with said fixed base line, between the ribbon on the one hand and the scribing tool on the other hand, and utilizing changes in said sensed distance to correspondingly transversely adjust the scribing tool, to maintain at a predetermined value the distance of said scribing tool from said center line.

2. The method of scribing a ribbon of glass moving continuously in the direction of its length and subject to transverse shift relatively to a fixed datum line parallel with said direction, comprising, positioning over the ribbon a pair of scribers in contact with the ribbon and separated a fixed distance transversely of the ribbon, sensing the position of an edge of the ribbon at a point determined by the intersection with said edge, of a plane substantially through the scribers and normal to said line, to determine the distance of said point from said line, and adjusting the scribers as a unit in said plane transversely of the ribbon, in accordance with change in said sensed distance.

3. The method of scribing a ribbon of glass moving continuously in the direction of its length and subject to lateral shift normal to said direction, comprising, mounting a scriber over and for scribing contact with the ribbon, and for translation transversely thereof, adjusting the contact position of the scriber transversely of the ribbon to a predetermined distance from one edge thereof, sensing the distance of separation between points determined by the intersection of a plane contiguous to said scriber and normal to the direction of travel of the ribbon, with said one edge and a fixed datum line parallel with said direction and substantially in the plane of the ribbon, and continuously adjusting the scriber parallel with said plane and transversely of the ribbon, directed by and in accordance with changes in the distance of separation of said points.

4. The method of separating into panels of predetermined dimensions, a ribbon of sheet material moving continuously in the direction of its length on and with a conveyor, comprising, measuring continuously the position of a point in an edge of the ribbon intersected by a fixed plane normal to said direction, with respect to a fixed datum line parallel with said direction, mounting a scribing tool over the ribbon for contact therewith substantially in said fixed plane and for selective adjustment transversely of the ribbon, measuring continuously the position of the tool with respect to said datum line, continuously comparing said positions, and correspondingly transversely adjusting the tool as required to maintain at a fixed value the algebraic sum of said measured positions.

5. The method of scribing upon a ribbon of glass moving horizontally in the direction of its length, lines delineating panels into which the ribbon is to be severed, comprising, identifying at a first station a defective area of the ribbon and measuring a first distance determining its separation from a fixed datum line parallel with said direction and substantially in the plane of the ribbon, measuring at said first station a second distance determining the separation from said line of a point in one edge of the ribbon, transmitting said distances to a control station, mounting a pair of scribers over and spaced transversely of the ribbon at a scribing station downstream from said first station, for movement individually transversely of the ribbon in a second plane normal to said line, algebraically adding said first and second distances to obtain a resultant distance, transmitting said resultant distance from said control station to said scribing station and as said defective area passes said scribing station, adjusting the positions of said scribers and their separation transversely of said ribbon in accordance with said resultant distance to encompass said defective area, measuring at said scribing station a third distance determining the separation from said line of a point in said one edge of the ribbon at said second station, and continuously correcting the transverse positions of said scribers as a unit in accordance with the difference between said second and third distances.

6. In an apparatus for scribing on a ribbon of glass moving in the direction of its length, lines delineating panels into which the ribbon is to be severed, first and second means at a first station adjacent said ribbon and detecting and transmitting signals of (a) the respective coordinates of defective areas of the ribbon passing said first station, with respect to a fixed base line parallel with said direction and (b) the distance of separation with respect to said line of a point in one edge of the ribbon at said first station, a scriber, means mounting said scriber at a second station downstream from said first station, for movement transversely of the ribbon and in contact therewith, follow-up means connected with said scriber and operable to move the same transversely of said ribbon, and means controlling said follow-up means by and in accordance with the algebraic sum of signals (a) and (b) aforesaid.

7. The apparatus of claim 6, means at said second station in continuous contact with said edge thereat and determining (c) the distance of separation from said line of a point in said edge of the ribbon passing said second station, and means responsive to said contact means for continuously correcting said follow-up means in accordance with difference between distances (b) and (c).

8. In an apparatus for the scribing on a ribbon of glass moving continuously in the direction of its length, of lines delineating thereon panels into which the ribbon is to be severed, a first bridge, means mounting said first bridge over the ribbon and for guided translation transversely thereof, first and second scribers each mounted on said bridge adjacent a respective edge of said ribbon for scribing contact therewith, means interconnecting said scribers for translation as a unit, pick-off means sensing the position of one edge of the ribbon in the plane of said scribers normal to said direction, a motor connected with said bridge to transversely adjust the position thereof, follow-up means connected with said motor to control the same, and connections between said pick-off means and said follow-up means to energize said motor and transversely shift said scribers by and in accordance with shift of the ribbon transversely of said direction and with respect to said line.

9. The apparatus of claim 8, said pick-off means comprising a follower mounted for guided movement to contact said one edge of the ribbon, means urging said follower continuously into contact with said edge, a first plurality of switches in fixed spaced relation adjacent said follower, and a first cam fixed with said follower and moved by and in response to movements thereof to close said switches in succession.

10. The apparatus of claim 9, said follow-up means comprising a second plurality of switches fixed in spaced relation adjacent said bridge, a second cam mounted for movement as a unit with said scribers and operable to close said second plurality of switches in succession, and circuit means interconnecting each switch of said first plurality with a respective switch of said second plurality, through said motor.

11. The apparatus of claim 10, each said plurality of switches being disposed in a straight line normal to said direction and parallel with the ribbon, each said cam including a straight edge parallel with said straight line and effective in each position thereof to hold closed a predetermined plurality of the switches, less than all, of those contacted thereby.

12. In a machine for scribing on a ribbon of glass moving in the direction of its length, longitudinally-extending lines delineating side band strips to be severed, a bridge mounted over and extending across the ribbon, a shaft, means mounting said shaft on said bridge for axial translation in a direction normal to said direction of movement of the ribbon and parallel therewith, first and second scribers, means adjustably fixing each said scriber to said shaft and for contact with the ribbon, a motor carried by said bridge, means operated by said motor for axially adjusting said shaft and scribers as a unit, and means responsive to lateral shift of the ribbon for energizing said motor.

13. The machine of claim 12, said last-named means comprising a follower mounted for translation normal to the direction of travel of the ribbon, means yieldingly urging said follower into contact with an edge of the ribbon adjacent said bridge, and pick-off means including a contact closer fixed with said follower.

14. In a machine for scribing upon a ribbon of glass moving continuously in the direction of its length, a bridge extending over and transversely of the ribbon, normal to said direction, a plurality of scribers each mounted on said bridge for independent guided translation therealong transversely of the ribbon and for scribing contact therewith, a plurality of motors each carried by a respective one of said scribers, a plurality of wheels each journaled on a respective one of said scribers and each in frictional contact with said bridge, a drive between each said motor and its wheel, means responsive to translation of each said scriber along said bridge and operable to transmit to a remote station, signals indicative of the individual positions of each said scriber on and along said bridge, said last-named means comprising a gaging tape fixed with and extending along said bridge through apertures in each said scriber and parallel with the direction of travel thereof, there being a plurality of uniformly-spaced apertures in and through said tape, a follower, means carried by said bridge and mounting said follower for translation normal to said direction into contact with an edge of the ribbon, means yieldingly urging said follower toward contact with said edge of the ribbon, and means responsive to translation of said follower as aforesaid, and operable to transmit to said station, signals indicative of said translation.

15. A machine for scribing upon a ribbon of material moving continuously in the direction of its length, lines along which the ribbon is to be severed into panels, comprising, a bridge, track means adjacent the ribbon and parallel with said direction, means mounting said bridge over the ribbon transversely thereof for guided translation on and along said track means, a pad mounted on said bridge and movable from a first position clear of the ribbon, to a second position in frictional contact therewith, a scriber mounted on said bridge for guided translation therealong, normal to said direction, a motor carried by said scriber, a wheel journaled on said scriber and engaging said bridge, a driving connection between said motor and said wheel, motor means carried by said bridge and operable to translate said bridge and scriber in said direction, said motor and said motor means being energizable from a remote station, and means transmitting to said station, discrete signals indicative of the position relatively to said bridge, of an edge of the ribbon.

References Cited

UNITED STATES PATENTS

| | | | |
|---|---|---|---|
| 3,018,587 | 1/1962 | Insolio et al. | 33—32 X |
| 3,165,017 | 1/1965 | Galabert | 33—125 X |
| 3,176,567 | 4/1965 | McCormick et al. | 83—368 X |
| 3,246,550 | 4/1966 | Galey et al. | |

FOREIGN PATENTS 681,000  10/1952  Great Britain.

LEONARD FORMAN, *Primary Examiner.*

HARRY N. HAROIAN, *Examiner.*